Patented Feb. 28, 1950

2,499,055

UNITED STATES PATENT OFFICE 2,499,055

PRODUCTION OF NITRILES

John N. Cosby and Michael Erchak, Jr., Morris Plains, N. J., assignors to Allied Chemical & Dye Corporation, New York, N. Y., a corporation of New York No Drawing. Application April 2, 1946, Serial No. 659,140

12 Claims. (Cl. 260—465)

This invention relates to a process for the production of aromatic nitriles by oxidizing in the presence of ammonia an alkyl or alkenyl substituted benzene or naphthalene or an alcohol, an aldehyde or a ketone which is an intermediate oxidation product of such substituted benzene or naphthalene.

It is known that by oxidizing certain aromatic compounds in the vapor phase by means of molecular oxygen, those compounds may be converted to partial oxidation products such as acids or acid anhydrides. Thus, it is well known that benzene vapors may be oxidized with air or other oxygen gas to form maleic anhydride or maleic acid. Naphthalene may be oxidized to phthalic anhydride. These oxidation reactions, carried out by passing the mixture of aromatic compound and molecular oxygen in contact with an oxidation catalyst at suitable conditions of temperature, reaction time, etc., give good yields of the desired intermediate oxidation product.

The vapor phase oxidation process, however, has found but limited application for the treatment of substituted benzene compounds. In general, they have not been found to be oxidizable by molecular oxygen in the vapor phase to form a desired product in good yield. Their oxidation cannot be controlled, as can the oxidation of benzene or naphthalene to proceed to a given stage of partial oxidation, such as the formation of an acid or acid anhydride. The substituted benzene compounds show a strong tendency for the oxidation to form a mixture of various partial products and to go all the way to the formation of oxides of carbon and water. There is also the formation of condensation products. With one or two possible exceptions, therefore, such as the oxidation of toluene to benzaldehyde and benzoic acid, there has been little indication that the vapor phase oxidation of alkyl or alkenyl substituted benzenes can be of practical use in the preparation of intermediate oxidation products of the substituted benzene compounds.

We have now discovered, however, that in oxidizing substituted benzenes or naphthalenes in the vapor phase with molecular oxygen, by having ammonia present in the reaction mixture, nitriles may be formed in good yields. It appears that the ammonia reacts with partial oxidation products of the substituted benzenes or napthalenes to form nitriles which are relatively stable under the reaction conditions and hence are not further oxidized down to, for example, oxides of carbon and water. Our discovery provides, therefore, a method whereby desired, useful products may be obtained in good yields in the oxidation of the substituted benzenes and naphthalenes and may be recovered from the reaction products.

The aromatic compounds suitable for conversion into the nitriles by the process of this invention may be represented by the formula:

where R represents —H or an alkyl or an alkenyl radical, R' and R" represents —H, —OH or =O or an alkyl or an alkenyl radical, and X represents the unsubstituted phenyl radical or the phenyl radical substituted in any of the 2 to 6 positions by —F, —Cl, —Br, or the radical

or represents the phenyl radical condensed with no more than one benzene ring.

Where in the above formula R, R' and R" represent hydrogen or an alkyl or an alkenyl radical and X represents the unsubstituted phenyl radical or such radical condensed with no more than one benzene ring, the aromatic compounds are alkyl substituted or alkenyl substituted benzene and naphthalene hydrocarbons. Alcohols, aldehydes or ketones which are intermediate oxidation products of such hydrocarbons contain the oxygen linked directly to acyclic carbon with no oxygen atom being directly linked to more than one of the acyclic carbon atoms and no acyclic carbon atom being directly linked to oxygen by more than two of its valences.

The following are representative of the various substituted benzenes and naphthalenes which may be oxidized in the presence of ammonia in accordance with the process of our invention to form the indicated nitriles:

Toluene to form benzonitrile;
Para-xylene to form p-tolunitrile and terephthalonitrile;
Meta-xylene to form m-tolunitrile and isophthalic acid nitrile;
Ortho-xylene to form o-tolunitrile, phthalonitrile and phthalimid;
Mesitylene to form trimesic acid trinitrile;
Ethylbenzene to form benzonitrile;
p-Cymene to form p-tolunitrile, p-isopropyl benzonitrile and terephthalonitrile;
Chlorotoluene to form chlorobenzonitrile;
Alpha-methyl naphthalene to form alpha-cyano naphthalene and phthalonitrile.

In place of ammonia a primary alkyl amine may be used to form the nitriles. Any nitrogen compound converted into ammonia at the elevated temperatures at which the oxidation of the substituted benzene compound is carried out may be used in place of ammonia.

The reaction mixture should contain at least one molecule of ammonia for every one nitrile radical combined in the product of the reaction. Further, it has been found that about two molecules of ammonia for every —CN radical to be combined with the substituted benzene or naphthalene represents a ratio below which the yields of nitrile rapidly decrease. The yields of nitrile are improved by additionally including in the reaction mixture about 1 mol of ammonia for every carbon atom to be removed from the substituted benzene or naphthalene in forming the nitrile. Accordingly, we preferably pass into contact with the oxidation catalyst a reaction mixture containing, in addition to two mols $NH_3$ for each —CN radical to be formed by the reaction, about 1 mol or more of ammonia for every carbon atom which is to be burned from the molecule of the substituted benzene or naphthalene in forming the desired nitrile. More than these amounts of ammonia may, of course, be used but as the amount of ammonia is increased above these proportions, the amount of ammonium carbonate and carbamate in the product gases increases. Large quantities of the carbonate and carbamate increase the difficulty in recovering the nitrile from the oxidation products.

The following are representative of the ratios of ammonia to substituted benzene or naphthalene compounds which it is preferred to employ in the inlet gases for formation of the nitrile and of the preferred additional amount of ammonia in these gases when carbon is burned from the molecule of the substituted benezene or naphthalene in forming the nitrile:

In oxidizing toluene to benzonitrile—about 2 or more mols of ammonia for every 1 mol of toluene;

In oxidizing a xylene to the mononitrile—2 or more mols of ammonia for every 1 mol of xylene;

In oxidizing a xylene to a dinitrile—about 4 or more mols of ammonia for every 1 mol of xylene;

In oxidizing ethylbenzene to benzonitrile—about 2 or more mols of ammonia for very 1 mol of ethylbenzene and preferably about 3 or more mols of ammonia for every 1 mol of ethylbenzene.

In oxidizing p-cymene to form p-isopropyl benzonitrile—about 2 or more mols of ammonia for every 1 mol of p-cymene;

In oxidizing p-cymene to form p-tolunitrile—about 2 or more mols of ammonia for every 1 mol of p-cymene and preferably about 4 or more mols of ammonia for every 1 mol of p-cymene;

In oxidizing p-cymene to form terephthalonitrile—about 4 or more mols of ammonia for every 1 mol of p-cymene and preferably 6 or more mols of ammonia for every 1 mol of p-cymene.

When a primary alkyl amine is employed instead of ammonia, the same molecular proportions are used of amine to substituted benzene compound as described above for ammonia.

Other conditions in carrying out the process of our invention may be those heretofore employed for the vapor phase oxidation of aromatic compounds, e. g. for the oxidation of benzene to maleic anhydride or naphthalene to phthalic anhydride. Thus, in carrying out our invention the substituted benzene mixed with air or other oxygen gas in proportions such that the mixture is non-explosive, is passed at elevated temperatures in contact with an oxidation catalyst. The reaction mixture may contain an excess of oxygen over that stoichiometrically required for the oxidation of the aromatic compound to the related acid or even an excess over that required for complete oxidation of the organic compound. Insufficient oxygen for oxidation of the aromatic compound to the related acid may be used. The rate of passage of the reaction mixture over the catalyst, temperature, and other operating conditions are regulated, as known to those familiar with the art of partially oxidizing aromatic compounds, to give a desired attack of the organic material without undue complete oxidation to oxides of carbon and water. While the several reaction conditions are related to each other so variations in one condition will permit varying another condition without substantially affecting the results of the process, a representative set of conditions is as follows: passing a reaction mixture containing 1.5 to 7 mols $NH_3$ and 50 to 200 mols air for every 1 mol of the substituted benzene over a catalyst active for oxidizing benzene to maleic anhydride at about 425° C. to about 475° C. and a space velocity of 1000 to 5000 cc. of reaction gas (calculated to S. T. P.) per hour per cubic centimeter apparent volume of catalyst.

The catalysts employed in carrying out our process may be any of the catalysts which promote the oxidation of organic compounds, preferably those catalysts which have been found particularly suitable for oxidizing benzene to maleic anhydride or naphthalene to phthalic anhydride. The preparation and composition of preferred catalysts are disclosed, for example, in United States Patents 2,081,272 which issued May 25, 1937 to Harold B. Foster and 2,180,353 which issued November 21, 1939 to the same inventor, and United States Patent 2,294,130 which issued August 24, 1942 to Frank Porter. When substituted benzene compounds are oxidized in the presence of ammonia or a primary alkyl amine to form nitriles, however, the nature of the catalyst appears to be of less importance than in the oxidation of benezene or naphthalene to maleic anhydride or phthalic anhydride. Thus, catalysts which give but poor yields of the acid anhydrides may be used effectively when the oxidation is carried out with ammonia or the amine present in accordance with our invention. We attribute this to the ammonia or amine reacting with intermediate oxidation products of the substituted benzenes, particularly with alcohols, aldehydes, ketones or acid anhydrides to form the corresponding nitriles and to these nitriles being exceptionally stable under the reaction conditions. Hence, the nitriles are formed and remain undecomposed under conditions which do not give good yields of less stable intermediate oxidation products which are formed in the previously known procedures of oxidizing aromatic compounds with molecular oxygen.

Among the numerous catalysts which may be employed in carrying out our process, we may mention thorium, molybdenum, vanadium, tin, chromium, tungsten, cobalt, iron, manganese or copper, employed as the metals or the metal oxides, the oxides of aluminum, uranium, etc., vanadates, vanadic acid and mixtures of these various catalysts with each other and with other materials, particularly catalysts containing both vanadium and molybdenum oxides. While the suitable temperatures will vary according to the particular catalysts being employed and other operating conditions, in general the reaction mixture containing the substituted benzene or naphthalene compounds, oxygen and ammonia or primary amine is contacted with the catalyst at temperatures ranging from about 350° to 600° C., preferably at about 400° to about 500° C.

Our invention will be further illustrated by the following examples:

*Example 1.*—A mixture of ammonia, toluene vapors and air in the proportions of 2 mols ammonia, 1 mol toluene and 75 mols of air is preheated and passed in contact with a vanadium-molybdenum-phosphorus catalyst at 450° C. and at a space velocity of 2150. The catalyst is prepared by the procedure described for making "Catalyst A (a maleic anhydride catalyst)" on page 2 of United States Patent 2,294,130 of August 24, 1942 to Frank Porter. In making the catalyst ammonium vanadate, molybdenum trioxide and phosphoric acid are used to form the active catalytic material and 8-10 mesh alundum as a carrier, in proportions such that the catalyst contains 11.4% vanadium, 3.9% molybdenum and 0.034% phosphorus (calculated as the oxides $V_2O_5$, $MoO_3$ and $P_2O_5$, respectively). Using this catalyst and with the foregoing reaction conditions, 95% of the toluene was attacked with a 75 mol percent yield of benzonitrile based on the toluene attacked.

In the process of this example when the temperature, at which the reactants were contacted with the catalyst was increased to 500° C., the space velocity decreased to 1500 and the amount of air mixed with the ammonia and toluene decreased by one-third (giving a reaction mixture containing 2 mols ammonia and 50 mols of air for every 1 mol of toluene), the percent attack on the toluene increased to about 100%, although the yield of benzonitrile decreased to about 55 mol percent.

*Example 2.*—p-Chlorotoluene mixed with ammonia and air in the proportions of 3.6 mols of ammonia and 200 mols of air to every 1 mol of p-chlorotoluene, was passed in contact with the catalyst of Example 1 at 455° C. and a space velocity of 2250. There was obtained an 82% attack of the p-chlorotoluene with about 47 mol percent yield of chlorobenzonitrile.

*Example 3.*—p-Xylene was mixed with 3 mols of ammonia and 60 mols of air for every 1 mol of p-xylene and passed at a temperature of 440° C. and a space velocity of 2700 in contact with the vanadium-molybdenum-phosphorus catalyst of Example 1. 85% of the p-xylene was attacked with about a 48 mol percent yield of the corresponding nitriles, represented by about 22 mol percent yield of p-tolunitrile and about 26 mol percent yield of terephthalonitrile.

At 455° C., a space velocity of 1500 and a mol ratio of 3 mols ammonia and 90 mols of air per mol of p-xylene, an attack of 81% of the p-xylene was obtained, with about a 45 mol percent yield of the nitriles of which about 25 mol percent was p-tolunitrile and about 20 mol percent was terephthalonitrile.

m-Xylene is similarly oxidized in the presence of ammonia to form the corresponding mono- and dinitriles.

*Example 4.*—p-Cymene was mixed with 3 mols of ammonia and 75 mols of air for every 1 mol of p-xylene and the mixture passed in contact with the vanadium-molybdenum-phosphorus catalyst of Example 1 at 410° C. to 475° C. and a space velocity of 1300. 93% attack of the p-cymene occurred, with about a 62 mol percent yield of nitriles of which about 25 mol percent was p-tolunitrile, 17 mol percent was p-isopropyl benzonitrile and 20 mol percent was terephthalonitrile.

*Example 5.*—o-Xylene was mixed with 3 mols ammonia and 150 mols air for every one mol o-xylene and the mixture passed at 440° C. and a space velocity of 2200 in contact with the vanadium-molybdenum-phosphorus catalyst by Example 1. 67% of the o-xylene was attacked with about a 31 mol percent yield of the corresponding mono- and dinitriles in the molecular ratio of about two-thirds o-toluntrile and one-third phthalonitrile. In addition to these nitriles there was about 11 mol percent yield of phtalimid.

We claim:

1. The process for the production of an aromatic nitrile which comprises contacting with a catalyst for the vapor phase partial oxidation of benzene and naphthalene, respectively, to maleic and phthalic anhydride, a gaseous mixture containing oxygen, ammonia and an organic compound from the group consisting of the alkyl and alkenyl substituted benzene and naphthalene hydrocarbons and the intermediate partial oxidation products of said hydrocarbons in which the oxygen present is directly combined with acyclic carbon with no oxygen atom being directly linked to more than one of the acyclic carbon atoms and no acyclic carbon atom being directly linked to oxygen through more than two of its valences, said gaseous mixture containing at least 1 mol ammonia for every one —CN radical in the nitrile reaction product of said organic compound and being contacted with said catalyst at temperatures in the range 350° to 600° C.

2. The process for the production of an aromatic nitrile which comprises contacting with a catalyst for the vapor phase partial oxidation of benzene and naphthalene, respectively, to maleic and phthalic anhydride, a gaseous mixture containing oxygen, ammonia and an organic compound from the group consisting of the alkyl and alkenyl substituted benzene and napthalene hydrocarbons and the intermediate partial oxidation products of said hydrocarbons in which the oxygen present is directly combined with acyclic carbon with no oxygen atom being directly linked to more than one of the acyclic carbon atoms and no acyclic carbon atom being directly linked to oxygen through more than two of its valences, said gaseous mixture containing at least 2 mols ammonia for every one —CN radical in the nitrile reaction product of said organic compound and in addition thereto about 1 mol of ammonia for every carbon atom burned from the molecule of said organic compound in forming the nitrile, and being contacted with said catalyst at temperatures in the range 350° to 600° C.

3. The process for the production of an aromatic nitrile which comprises contacting with a catalyst for the vapor phase partial oxidation of benzene and naphthalene, respectively, to maleic and phthalic anhydride, a gaseous mixture containing air, ammonia and an organic compound from the group consisting of the alkyl and alkenyl substituted benzene and naphthalene hydrocarbons and the intermediate partial oxidation products of said hydrocarbons in which the oxygen present is directly combined with acyclic carbon with no oxygen atom being directly linked to more than one of the acyclic carbon atoms and no acyclic carbon atom being directly linked to oxygen through more than two of its valences, said gaseous mixture containing 1.5 to 7 mols ammonia and 50 to 200 mols air for every 1 mol of the organic compound and being contacted with said catalyst at temperatures in the range 350° to 600° C.

4. The process of claim 1, wherein the organic compound in the gaseous mixture contacted with the catalyst is an alkyl substituted benzene.

5. The process of claim 2, wherein the organic compound in the gaseous mixture contacted with the catalyst is an alkyl substituted benzene.

6. The process of claim 3, wherein the organic compound in the gaseous mixture contacted with the catalyst is an alkyl substituted benzene.

7. The process for the production of benzonitrile which comprises contacting with a catalyst for the vapor phase partial oxidation of benzene and naphthalene, respectively, to maleic and phthalic anhydride, a gaseous mixture containing oxygen, ammonia and toluene, said gaseous mixture containing at least about 2 mols ammonia for every 1 mol toluene and being contacted with said catalyst at temperatures in the range 350° to 600° C.

8. The process for the production of an aromatic nitrile which comprises contacting with a catalyst for the vapor phase partial oxidation of benzene and naphthalene, respectively, to maleic and phthalic anhydride, a gaseous mixture containing oxygen, ammonia and a xylene, said gaseous mixture containing at least about 2 mols ammonia for every 1 mol of said xylene and being contacted with said catalyst at temperatures in the range 350° to 600° C.

9. The process for the production of an aromatic nitrile which comprises contacting with a catalyst for the vapor phase partial oxidation of benzene and naphthalene, respectively, to maleic and phthalic anhydride, a gaseous mixture containing oxygen, ammonia and p-cymene, said gaseous mixture containing at least about 2 mols ammonia for every 1 mol of said p-cymene and being contacted with said catalyst at temperatures in the range 350° to 600° C.

10. The process for the production of benzonitrile which comprises contacting a gas-vapor reaction mixture containing molecular oxygen, ammonia and toluene with an oxidation catalyst containing the oxides of vanadium, molybdenum and phosphorus, said reaction mixture containing at least about 2 mols of ammonia for every 1 mol of toluene and being contacted with the said catalyst at temperatures within the range of about 400° C. to about 500° C.

11. The process for the production of nitriles which comprises contacting a gas-vapor reaction mixture containing molecular oxygen, ammonia and a xylene with an oxidation catalyst containing the oxides of vanadium, molybdenum and phosphorus at temperatures within the range of about 400° C. to about 500° C., said reaction mixture containing at least about 2 mols of ammonia for every 1 mol of xylene.

12. The process for the production of nitriles which comprises contacting a gas-vapor reaction mixture containing molecular oxygen, ammonia and p-cymene with an oxidation catalyst containing the oxides of vanadium, molybdenum and phosphorus at temperatures in the range of about 400° C. to about 500° C., said reaction mixture containing at least about 2 mols of ammonia for every 1 mol of p-cymene.

JOHN N. COSBY.
MICHAEL ERCHAK, Jr.

REFERENCES CITED

The following references are of record in the file of this patent:

UNITED STATES PATENTS

| Number | Name | Date |
|---|---|---|
| 1,934,838 | Andrussow | Nov. 14, 1933 |
| 1,937,962 | Jaeger | Dec. 5, 1933 |
| 2,083,824 | Bond et al. | June 15, 1937 |
| 2,149,280 | Deem et al. | Mar. 7, 1939 |
| 2,177,619 | Nicodemus et al. | Oct. 24, 1939 |
| 2,186,754 | Giambalvo | Jan. 9, 1940 |
| 2,199,585 | Bone et al. | May 7, 1940 |
| 2,200,734 | Arnold et al. | May 14, 1940 |
| 2,203,861 | Deem et al. | June 11, 1940 |
| 2,289,036 | Parks et al. | July 7, 1942 |
| 2,299,755 | Jolly | Oct. 27, 1942 |
| 2,302,462 | Palmer et al. | Nov. 17, 1942 |